(12) United States Patent
Poling

(10) Patent No.: US 7,406,991 B2
(45) Date of Patent: Aug. 5, 2008

(54) PNEUMATIC TIRE WITH BEAD COMPOSITE

(75) Inventor: David Charles Poling, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 416 days.

(21) Appl. No.: 11/021,654

(22) Filed: Dec. 22, 2004

(65) Prior Publication Data

US 2006/0130953 A1    Jun. 22, 2006

(51) Int. Cl.
*B60C 15/02* (2006.01)
*B60C 15/024* (2006.01)
*B60C 15/04* (2006.01)
*B60C 17/04* (2006.01)

(52) U.S. Cl. .................. 152/540; 152/158; 152/520; 152/544

(58) Field of Classification Search .................. 152/540, 152/544, 158, 520
See application file for complete search history.

(56) References Cited

U.S. PATENT DOCUMENTS

| 5,785,781 | A | 7/1998 | Drieux et al. |
| 5,971,047 | A | 10/1999 | Drieux et al. |
| 6,179,028 | B1 | 1/2001 | Drieux et al. |
| 6,418,992 | B1 | 7/2002 | Drieux et al. |
| 6,571,846 | B2 | 6/2003 | Chandezon et al. |
| 2002/0179216 | A1 | 12/2002 | Pereira et al. |
| 2003/0098111 | A1 | 5/2003 | Teeple et al. |
| 2003/0150532 | A1 | 8/2003 | Marois et al. |
| 2003/0150538 | A1 | 8/2003 | Ceretta |

FOREIGN PATENT DOCUMENTS

WO    WO-03/093034 A2 *   11/2003

OTHER PUBLICATIONS

Webster's New World Dictionary of American English, eds. Victoria Neufeldt and David Guralnik, Simon & Schuster Inc., New York, 1988, p. 835.*
European Search Report, completed Jul. 6, 2006.

* cited by examiner

*Primary Examiner*—Adrienne C Johnstone
(74) *Attorney, Agent, or Firm*—June E. Rickey

(57) ABSTRACT

A run-flat tire has a radial carcass reinforcement ply extending through a pair of opposing sidewalls and anchored in opposing bead portions. At least one of the bead portions having a bead heel and a bead toe wherein the bead heel is radially outward and axially inward from the bead toe. At least one of the bead portions has a bead composite and a bead apex therein. The bead composite has a maximum axial width $W_B$, the axial width being measured perpendicular to the tire equatorial plane. The maximum axial width $W_B$ is greater than 50% of the maximum axial width W of the at least one bead portion, as measured from the opposing axial sides of the bead portion.

15 Claims, 4 Drawing Sheets

PNEUMATIC TIRE WITH BEAD COMPOSITE

FIELD OF THE INVENTION

The present invention relates to a pneumatic radial tire, and more particularly, to the structure of the bead region of the pneumatic radial tire.

BACKGROUND OF THE INVENTION

A tire with a radial carcass reinforcement usually comprises, a reinforcing bead core in each bead portion of the tire, about which the carcass reinforcement is anchored by winding or forming an upturn. The bead cores provide a clamping force for the tire when the tire is mounted upon the beads seats of a wheel rim. The clamping produces a certain compression of the bead portion between the bead core and the wheel rim, the clamping generally being brought about by a difference in the angles of the bead set and the rim seat respectively, and/or by a difference in the diameters of said seats.

The bead clamping force of the tire is particularly important in designing a run-flat tire or tire system. One such tire system that uses the clamping force to maintain operation of the tire during underinflated or uninflated operating conditions is disclosed in U.S. Pat. Nos. 5,785,781 and 5,971,047. The radial carcass reinforcement of the tire, which is anchored within each bead to at least one inextensible annular reinforcement element, has a profile, when the tire is mounted on its operating rim and inflated to its operating pressure, with a direction of curvature which is constant in the sidewalls and bead regions which ends in the bead toe. The preferred bead region of this type of tire is more fully disclosed in U.S. Pat. No. 5,971,047, wherein the carcass reinforcement has a hooking structure.

In the tire of the above-disclosed run-flat system, when the tire system is inflated at reduced or zero pressure, the beads of the tire remain in place when travelling as the structure creates an increase of the clamping of the bead toe on the mounting rim as a function of the tension of the carcass reinforcement. The structure also makes it possible to have initial clamping on rim of low value, given that said clamping will increase when the tire is inflated to its recommended pressure.

In the tires described above, the bead regions of the tire employ a bead core, a hard rubber talon, and an apex structure. Typically, the carcass reinforcement ply passes radially inward of the bead core and envelopes the talon, passing back under the bead core. This construction requires special building equipment, making the tire more expensive and complicated to manufacture.

SUMMARY OF THE INVENTION

The present invention is directed toward a run-flat tire and run-flat tire system. The run-flat tire system has a tire, a wheel rim, and a support ring located within the tire cavity and mounted on the wheel rim. The wheel rim has a bead seat, the bead seat has an axially outer end closer to the axis of rotation than the axially inner end thereof. The tire is has a pair of opposing sidewalls and two bead portions. At least one of the bead portions terminates axially to the outside by a tip and is intended to be mounted on one of the wheel rim bead seats. The tire has a radial carcass reinforcement ply extending through the tire sidewalls and anchored in each bead portion.

In one aspect of the invention, in at least one of the bead portions, the bead portion has a bead composite and a bead apex therein. The bead composite has a maximum axial width $W_B$, the axial width being measured perpendicular to the tire equatorial plane. The maximum axial width $W_B$ is greater than 50% of the maximum axial width W of the at least one bead portion, as measured from the opposing axial sides of the bead portion. Preferably, the bead composite has a maximum axial width $W_B$ of greater than 70% of the maximum axial width W of the at least one bead portion.

In another aspect of the invention, wherein the tire has, in at least one of the bead portions, the bead portion has a bead composite and a bead apex therein bead composite has a maximum axial width $W_B$, the axial width being measured perpendicular to the tire equatorial plane. The maximum axial width $W_B$ is in the range of 100% to 150% of a maximum axial width $W_A$ of the bead apex.

In another aspect of the invention, the bead composite is comprised of wire embedded in an elastomer. The wire is either a monofilament or a cabled wire. The wire is formed from individual filaments, the filaments having a diameter in the range of 0.12 to 0.38 mm. If the bead composite wire is a cabled wire, the cabled wire may have an exemplary construction of 2x, 3x, 2+1, 2+2, or 1+3.

In another aspect of the invention, the bead composite is comprised of an elastomer having a Shore A hardness in the range of 45 to 80. The shore A hardness of the bead composite elastomer is greater than the Shore A hardness of the elastomer comprising the bead apex.

In another aspect of the invention, the bead composite is formed of multiple turns of either a single wire or single turns of multiple wires. In a cross-sectional view of the bead composite, the wire turns are arranged in either horizontal or vertical rows. In one embodiment, the wire turns in each row are staggered relative to the wire turns in the adjacent rows.

In another aspect of the invention, a spacing is created between the adjacent turns or windings of the wire. The spacing between the adjacent wire windings varies across the width of the bead composite, creating a bead composite that varies in stiffness across the width of the bead composite. Preferably, the spacing between adjacent wire windings in the axially inner side of the bead composite is in the range of 50-95% of the spacing between adjacent wire windings in the axially outer side of the bead composite.

In another aspect of the invention, to vary the stiffness of the bead composite across the width of the bead composite, to create a softer axially outer side to the composite, the elastomer in the axially inner side has a shore A hardness greater than the Shore A hardness in the axially outer side. Alternatively, the wire in the axially inner side may have a diameter greater than the wire in the axially outer side.

In another aspect of the invention, the tire is intended to be mounted on a wheel rim, the wheel rim having a bead seat and an axially outer rim flange. To assist in mounting the tire and securing the tire onto the wheel rim, the reinforcement ply has a radially innermost point at a radial height P, as measured from the radially innermost point of the bead portion, of at least 40% of a bead seat depth F, the bead seat depth being measured from the top of the flange to a radially innermost point of the bead seat.

BRIEF DESCRIPTION OF THE DRAWINGS

The invention will be described by way of example and with reference to the accompanying drawings in which.

DETAILED DESCRIPTION OF THE INVENTION

Figure 1:
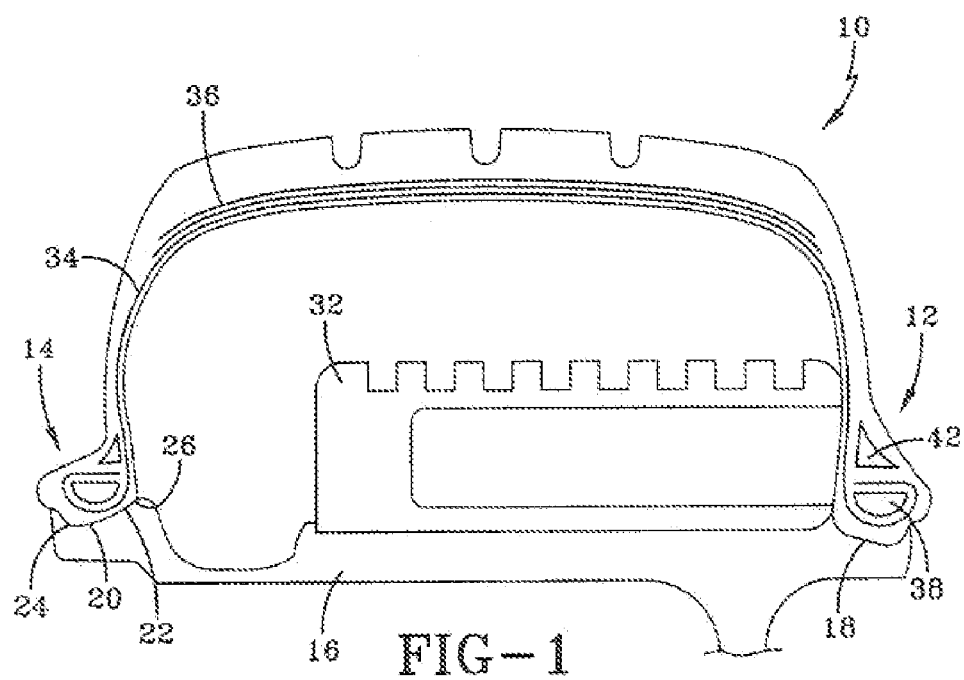
FIG. 1 is a cross sectional view of a run-flat tire system.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

FIG. 1 illustrates a run-flat tire system. The tire 10 is defined by a pair of opposing bead portions 12, 14, wherein one bead portion 12 has a bead diameter greater than the diameter of the opposing bead portion 14. The tire 10 is mounted on a wheel 16 having a pair of seats 18, 20; the seats 18, 20 having diameters corresponding to the different diameters of the tire bead portions 12, 14. Each wheel seat 18, 20 is defined by a bead seat 22 that has an axially outer end 24 closer to the axis of rotation of the mounted tire 10 than the axially inner end 26. In other words, the bead heel 28 of the tire 10 is radially outward and axially inward from the bead toe 30, see FIG. 2, versus the conventional bead heel being radially outward but axially outward from the bead toe. Mounted on the wheel 16 and within the tire cavity is a support ring 32. The support ring 32 will contact the underside of the tire 10 when the tire 10 is operated in underinflated or uninflated conditions.

The tire 10 has at least one radial carcass reinforcement ply 34 that extends from one bead portion 12 to the opposing bead portion 14, passing through the crown region of the tire 10. In the crown region of the tire 10, radially outward of the carcass reinforcement ply 34, is a belt structure 36. The belt structure 36 has at least two plies of reinforcing cords. The cords in each belt ply are crossed, relative to the cords in the adjacent belt ply. The cords in both the carcass reinforcement ply 34 and the belt plies are selected from reinforcing materials conventional for either carcass plies or belt plies.

Figure 2:
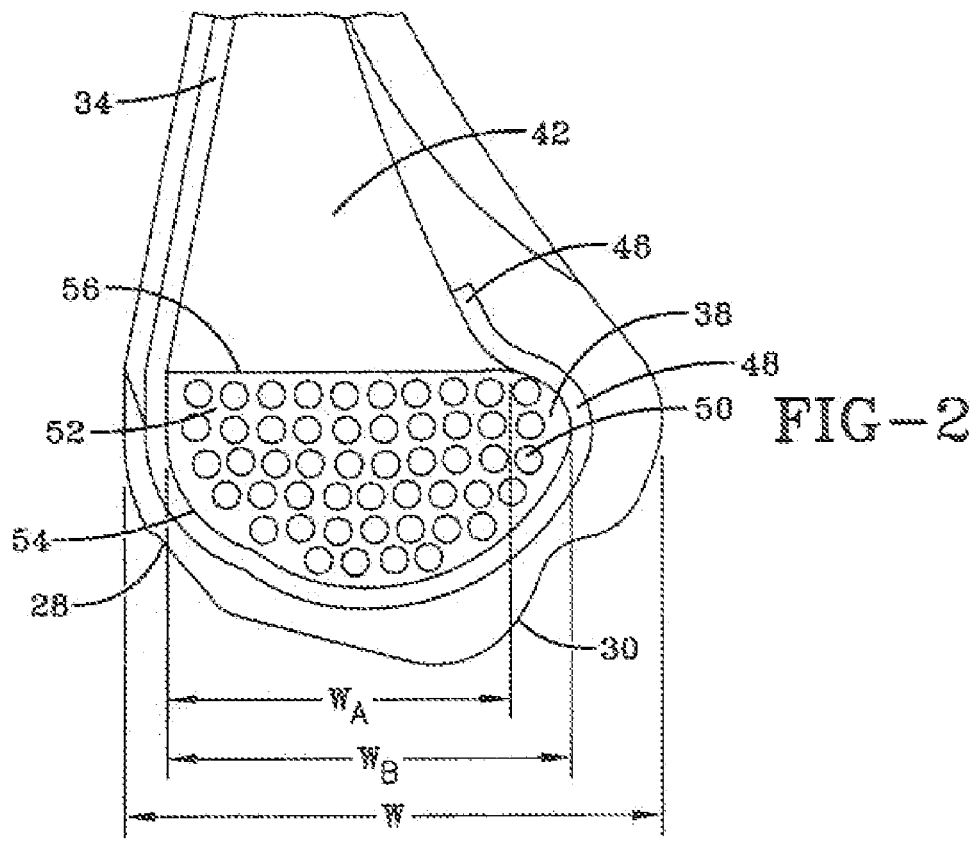
FIG. 2 is a cross sectional view of a tire bead.

The bead portion of the tire 10, as cured, is more fully illustrated in FIG. 2. In addition to the carcass reinforcement ply 34, the bead portion contains therein a bead composite 38 and a bead apex 42. The bead apex 42, located radially outward of the bead composite 38, is formed of an elastomeric material, having a Shore A hardness in the range of 30-65. The carcass reinforcement ply 34 extends from axially inward of the bead composite 38 to axially outward of the bead composite 38. The carcass reinforcement ply 34 terminates radially outward of the bead composite 38. The terminal end 46 of the reinforcement ply 34 is adjacent the bead apex 42. The carcass ply 34, as it passes through the bead portion, before the terminal end 46, follows a smoothly continuous curvature.

The bead composite 38 is a unitary combination of the prior art separate elements of a circular inextensible bead core ring and a hard rubber talon located axially outward of the bead core ring. The composite 38 is a matrix of wires 50 embedded in elastomer 52. The composite 38 may be formed by winding a wire, embedded in an elastomer sleeve, in a chuck to achieve the desired size and configuration. The wire turns can form either each horizontal layer or each vertical row in successive order until the desired configuration is achieved.

The wires 50 are formed from steel filaments. The steel filaments may be defined as regular tensile strength, high tensile strength, or super tensile strength wire. Each filament, prior to cabling to form the wire 50, has a diameter in the range of 0.12 to 0.38 mm. The wire 50 may be a monofilament or cabled wire. When cabled, possible wire constructions include, but are not limited to, 2x, 3x, 2+1, 2+2, and 1+3. If the cabled wire diameter D is too large, creating a very stiff wire, mountability of the tire 10 becomes difficult. The elastomer 52 in which the wires are embedded has a Shore A hardness in the range of 45 to 80, and greater than the Shore A hardness for the apex 42.

The bead composite configuration is defined by two primary sides/portions 54, 56: the lower curved portion 54 that extends from the axially inner side to the axially outer side and is smoothly continuous with the radially inner side, and the radially outer portion 56 is contingent with the radially inner side of the apex 42 or the carcass reinforcement ply turnup portion 48.

The bead composite 38 has a maximum axial width $W_B$, measured perpendicular to an equatorial plane of the tire 10, such that the bead composite 38 forms a substantial portion of the bead portion 12 or 14. The bead composite maximum axial width $W_B$ is greater than 50% of the maximum bead portion width W. Preferably, the bead composite maximum axial width $W_B$ is greater than 70% of the maximum bead portion width W. The bead composite 38 also has a maximum width $W_B$ at least equal or greater than the maximum width $W_A$ of the apex 42. The bead composite maximum width $W_B$ is in the range of 100-150%; preferably 110-140%. In the illustrated tire bead of FIG. 2, $W_B$ is approximately 120% of $W_A$. By forming the bead composite 38 within these defined ranges, it provides the bead portion 12 or 14 with sufficient clamping force to maintain the tire 10 on the wheel 16 during operation.

Figure 3:
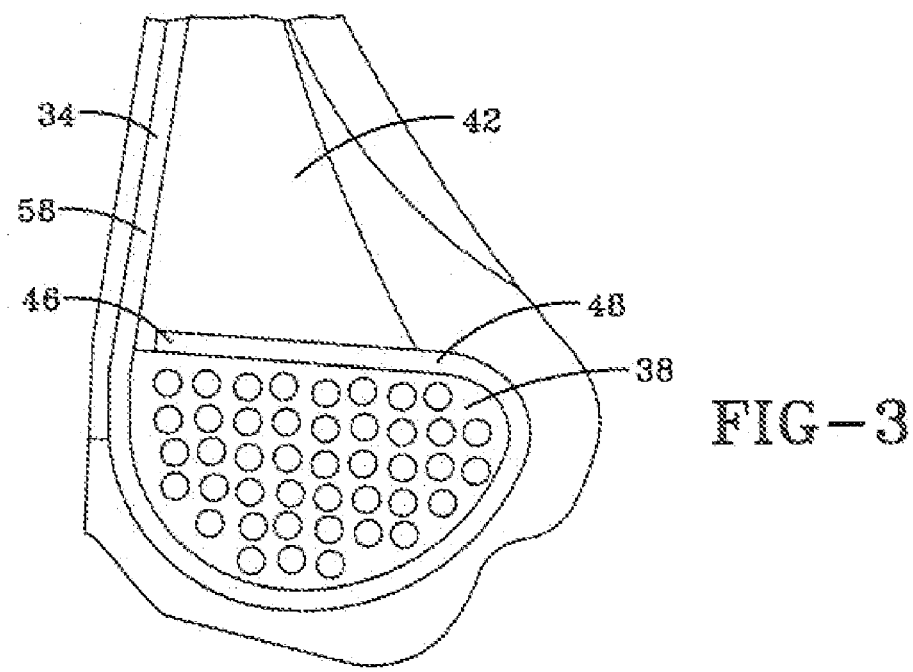
FIGS. 3-7 are alternative embodiments of a tire bead constructions.

In the bead region illustrated in FIG. 3, the carcass reinforcement ply 34 extends from axially inward of the bead composite 38 to axially outward of the bead composite 38 with the terminal end 46 of the carcass reinforcement ply 34 being sandwiched between the bead composite 38 and the bead apex 42. In securing the terminal end 46 of the reinforcement ply 34, the ply end 46 may also lie directly adjacent the main portion 58 of the reinforcement ply 34, see FIG. 8.

The bead composite 38 of FIG. 3 is substantially similar to that of FIG. 2, with the illustrative number of wires being different. The exact number of wire turns forming the composite will be dependent on the actual dimensions of the bead region, the actual dimensions of the bead composite and the wire diameter D. At a minimum, the bead composite 38 will have at least three horizontal rows of wire 50.

Figure 4:
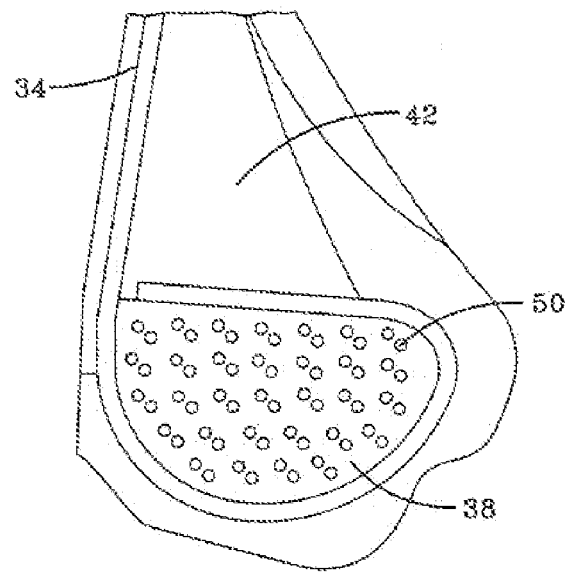

The bead composite 38 of FIG. 4 illustrates the use of cabled wires 50 for the steel reinforcement of the bead composite 38. The cabled wires 50 have a 2x construction, wherein two filaments are twisted together to form the cabled wire 50. The cabled wires 50 are embedded in the elastomer 52 and molded to achieve the desired cross-sectional configuration.

Figure 5:
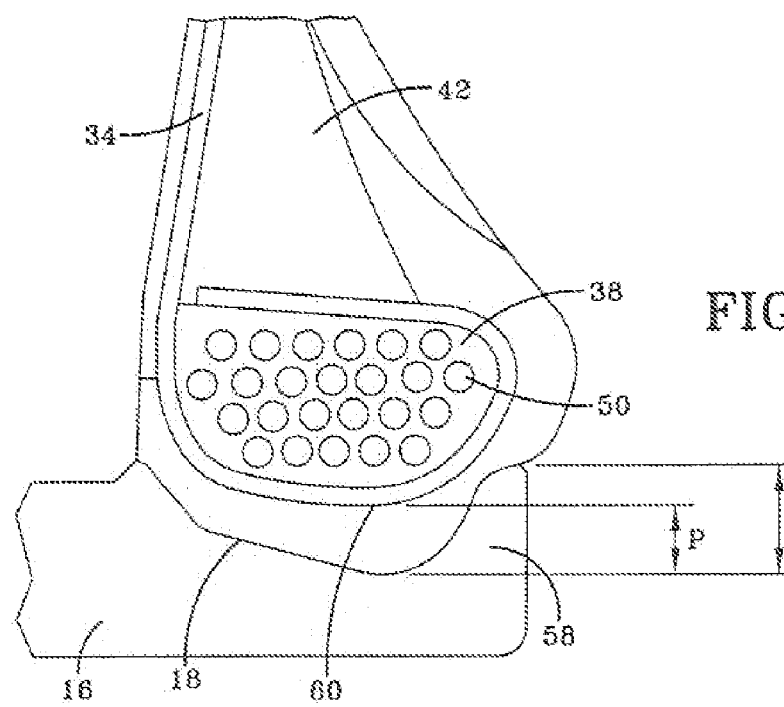

In the bead portion 12 or 14 of FIG. 5, the ply line of the carcass reinforcement ply 34 has been modified to take into account the stiffness of the bead composite 38. The bead composite 38 must be stiff and relatively inflexible in the radial direction to retain the tire on the wheel; however, if the composite 38 is too stiff, mounting of the tire becomes difficult as the bead region will not pass over the wheel flange 58. To achieve the desired mounting ability, the radially innermost point 60 of the carcass ply 34 as it turns around the bead composite 38 is located a radial height P, as measured from the radially innermost point of the bead portion, of at least 40% of the greatest bead seat depth F, the bead seat depth F is measured from the top of the flange 58 to innermost point of the bead seat. However, the radial height P of the radially innermost point 60 of the carcass ply 34 should not be more than 75% of the bead seat depth F. If the radial height P is greater than 75%, there may be insufficient compression force to retain the bead portion of the tire 10 on the wheel 16.

Additionally, the wires 50 in each horizontal row in the bead composite 38 are staggered relative to the wires 50 in each adjacent row. This is comparison to some of the vertically aligned wires 50 as illustrated in the bead composites 38 of FIGS. 2 and 3.

Figure 6:
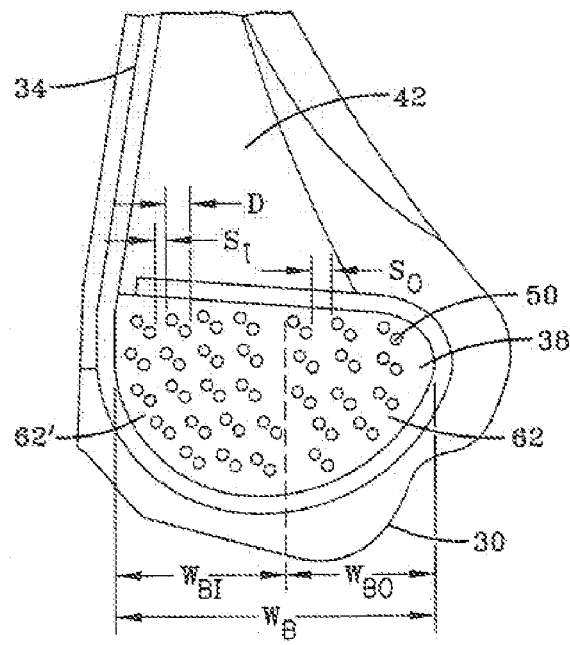

In the bead region 12 or 14 of FIG. 6, the relative spacing between the wires 50 is varied across the width of the bead composite. Adjacent wires 50 in the axially inner portion 62' of the bead composite 38 have a relative spacing $S_1$ less than the relatively spacing So between adjacent wires 50 in the axially outer portion 62 of the bead composite 38. The relative spacing $S_1$ of the axially inner bead wires 50 is in the range of about 50% to 95% of the relative spacing $S_O$ of the axially outer bead wires 50. By varying the spacing of the adjacent wires 50, the stiffness of the bead composite 38 varies across the axial width of the composite 38, with the axially inner portion 62' of the bead composite 38 being stiffer than the axially outer portion 62. Preferably, the axially inner portion 62', characterized by an increased stiffness in comparison to the axially outer portion 62, has a width WBI of approximately 50% to 75% of the bead width WB. The axially outer portion 62 has a width WBO of approximately 50% to 25% of the bead width WB. This stiffness variation may improve the mountability of the tire 10 on the wheel 16, enabling the bead toe 30 to pass over the wheel flange 58.

To form such a bead composite, the elastomeric coating 52 of the bead wires 50 in the axially outer portion 62 is increased in thickness relative to the coating thickness of the elastomer 52 on the axially inner bead wires.

Figure 7:
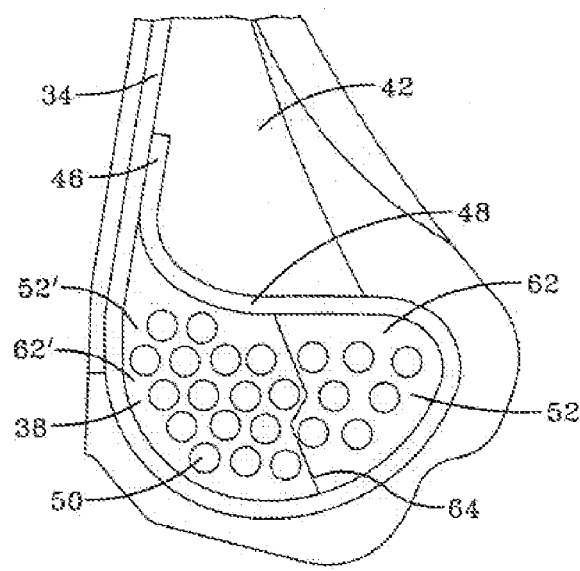

In the bead region illustrated in FIG. 7, the bead composite 38 is defined by the axially inner portion 62' having a stiffness greater than the axially outer portion 62. The bead wires 50 in the axially adjacent portions 62, 62' are varied in relative spacing in a manner previously discussed. Additionally, the Shore A hardness of the elastomer 52' in the axially inner portion 62' is greater than the Shore A hardness of the elastomer 52 in the axially outer portion 62. The difference in Shore A hardness is at least 5; preferably greater than 10. The difference in the Shore A hardness may be increased if the relative spacing of the all the wires 50 in the bead composite 38 is substantially equivalent, as seen in FIGS. 2-4.

One method of forming such a bead composite is to form the bead wires from two different wire windings. Each wire winding is coated in a different elastomer, the elastomers having a difference in their Shore A hardness. The base elastomers, ideally, are identical so that the two different elastomers will readily bond together. The two wires are then wound adjacent in the chuck to form the bead composite 38. To form the composite as a unitary article, either the coated wires may be heated to a temperature to render the coated wires tacky so that the uncured bead composite will be a single unit, or the dividing line between the two portions 62, 62' may be a non-straight line 64 so as to create a mechanical interlocking action between the two portions 62, 62'.

Alternatively, in coating a single wire 50 with the elastomer, the elastomer in the extruder die may be switched from the first elastomer 52 to the second elastomer 52'. This would require knowing the exact length of wire required to form the axially inner and outer portions of the composite so that sufficient length of coated wire of a desired stiffness is achieved for each portion 62, 62'. This method of manufacturing reduces concerns about the bead composite 38 not being formed as a unitary article.

Another method of varying the stiffness between the axially inner portion 62' and the axially outer portion 62, not illustrated, is to vary the wire diameters in each portion 62, 62'. The bead composite 38 would be formed in a manner as discussed above using two different wire windings.

The tire of FIG. 1, having different bead portion diameters, is merely illustrative and the present invention of the bead composite may be employed in a tire having identical bead portion diameters. Additionally, the bead composite may be used in a tire of the illustrative construction that does not require the support ring 32 to support the tire during underinflated operating conditions.

What is claimed is:

1. A pneumatic radial tire, the tire comprising a radial carcass reinforcement ply, two sidewalls and opposing bead portions wherein the reinforcement ply is anchored in the opposing bead portions, at least one of the bead portions having a bead heel and a bead toe wherein the bead heel is radially outward and axially inward from the bead toe, the at least one of the bead portions comprising a bead composite and a bead apex therein, the bead composite is a matrix of wire embedded in an elastomer, and has a maximum axial width $W_B$ of greater than 50% of the maximum axial width W of the at least one bead portion.

2. The tire of claim 1 wherein the bead composite has a maximum axial width $W_B$ of greater than 70% of the maximum axial width W of the at least one bead portion.

3. The tire of claim 1 wherein the bead composite maximum axial width $W_B$ is in the range of 100% to 150% of a maximum axial width $W_A$ of the bead apex.

4. The tire of claim 1 wherein the bead composite wire is either a monofilament or a cabled wire.

5. The tire of claim 4 wherein the wire is formed from steel filaments, the filaments having a diameter in the range of 0.12 to 0.38 mm.

6. The tire of claim 4 wherein the cabled wire has a cable construction of 2x.

7. The tire of claim 4 wherein the elastomer has a Shore A hardness in the range of 45 to 80.

8. The tire of claim 7 wherein the apex is comprised of an elastomer having a Shore A hardness, the Shore A hardness of the bead composite elastomer being greater than the Shore A hardness of the apex.

9. The tire of claim 4 wherein the wire of the bead composite is formed of either multiple turns of a single wire or single turns of multiple wires wherein the wire turns are arranged in either horizontal or vertical rows.

10. The tire of claim 9 wherein the wire in each row is staggered relative to the wire in each adjacent row.

11. The tire of claim 4 wherein a spacing is creating between the adjacent windings of the wire, and the spacing between the adjacent wire windings varies across the width of the bead composite.

12. The tire of claim 11 wherein the bead composite has an axially inner and an axially outer side, and the spacing between adjacent wire windings in the axially inner side of the bead composite is in the range of 50-95% of the spacing between adjacent wire windings in the axially outer side of the bead composite.

13. The tire of claim 4 wherein the bead composite has an axially inner and axially outer side and the elastomer in the axially inner side has a shore A hardness greater than the Shore A hardness in the axially outer side.

14. The tire of claim 4 wherein the bead composite has an axially inner and axially outer side and the wire in the axially inner side has a diameter greater than the wire in the axially outer side.

15. The tire of claim 1, the tire intended to be mounted on a wheel rim, the wheel rim having a bead seat and an axially outer rim flange, wherein the reinforcement ply has a radially innermost point at a radial height P, as measured from the radially innermost point of the bead portion, of at least 40% of a bead seat depth F, the bead seat depth being measured from the top of the flange to a radially innermost point of the bead seat.

* * * * *